United States Patent
Mall et al.

(10) Patent No.: US 10,774,936 B2
(45) Date of Patent: Sep. 15, 2020

(54) DIAPHRAGM FOR A DIAPHRAGM VALVE AND METHOD FOR THE MANUFACTURE OF THE DIAPHRAGM

(71) Applicant: SED Flow Control GmbH, Bad Rappenau (DE)

(72) Inventors: Valentin Mall, Gundelsheim (DE); Uwe Rutsch, Forchtenberg-Sindringen (DE)

(73) Assignee: SED FLOW CONTROL GMBH, Bad Rappenau (DE)

( * ) Notice: Subject to any disclaimer, the term of this patent is extended or adjusted under 35 U.S.C. 154(b) by 187 days.

(21) Appl. No.: 15/834,673

(22) Filed: Dec. 7, 2017

(65) Prior Publication Data

US 2019/0178395 A1    Jun. 13, 2019

(51) Int. Cl.
*F16K 7/12* (2006.01)
*F16J 3/02* (2006.01)

(52) U.S. Cl.
CPC ............. *F16K 7/126* (2013.01); *F16J 3/02* (2013.01)

(58) Field of Classification Search
CPC .......... F16J 3/02; F16K 7/126; F16K 7/12–17
See application file for complete search history.

(56) References Cited

U.S. PATENT DOCUMENTS

| | | | |
|---|---|---|---|
| 2,615,471 A | 10/1952 | McFarland | |
| 3,130,954 A | 4/1964 | McFarland | |
| 3,208,721 A * | 9/1965 | McHugh | F16K 7/126 251/331 |
| 4,615,934 A * | 10/1986 | Ellison | B29C 70/22 442/313 |
| 4,968,003 A | 11/1990 | Danko | |
| 5,093,067 A * | 3/1992 | Gibson | B29C 45/14778 264/257 |
| 5,217,797 A * | 6/1993 | Knox | B29C 70/086 428/167 |
| 5,352,506 A * | 10/1994 | Sowa | F16J 3/02 181/166 |
| 5,487,861 A * | 1/1996 | Reeder | F02M 17/04 264/134 |
| 6,230,609 B1 | 5/2001 | Bender et al. | |

FOREIGN PATENT DOCUMENTS

| | | |
|---|---|---|
| DE | 11 20 223 B | 12/1961 |
| DE | 7 420 903 U | 7/1976 |
| DE | 102 26 410 A1 | 1/2004 |

(Continued)

OTHER PUBLICATIONS

English Translation of German Office Action issued in German Patent Application No. 10 2016 114 975.6 dated Jun. 4, 2020.

*Primary Examiner* — Marina A Tietjen
(74) *Attorney, Agent, or Firm* — Baker & Hostetler LLP

(57) ABSTRACT

A diaphragm for a diaphragm valve comprises a base body made from an elastomer, the base body having a side facing towards the media and a side facing away from the media. A force transmission component is disposed at the base body on the side facing away from the media for the attachment of a spindle drive for a diaphragm valve. Furthermore, the base body has a reinforcement area, the reinforcement area being disposed on the outside of the base body on the side of the base body facing away from the media.

12 Claims, 2 Drawing Sheets

(56) References Cited

FOREIGN PATENT DOCUMENTS

| | | | |
|---|---|---|---|
| DE | 20 2009 013 401 U1 | 7/2010 | |
| DE | 20 2014 103 142 U1 | 8/2014 | |
| GB | 855348 A * | 11/1960 | ............ F16J 3/02 |
| GB | 1 372 223 A | 10/1974 | |
| GB | 1372223 A * | 10/1974 | |
| WO | 03/106935 A1 | 12/2003 | |

* cited by examiner

DIAPHRAGM FOR A DIAPHRAGM VALVE AND METHOD FOR THE MANUFACTURE OF THE DIAPHRAGM

FIELD OF THE INVENTION

The present invention relates to a diaphragm for a diaphragm valve having a base body made from an elastomer, the base body having a side facing towards the media and a side facing away from the media, a force transmission component being disposed at the base body on the side facing away from the media for the attachment of a valve spindle for a diaphragm valve, and the diaphragm valve has a reinforcement area. Furthermore, the present invention relates to a method for the manufacture of such a diaphragm.

BACKGROUND

Such diaphragms are standard components in diaphragm valves for use in process and systems technology for conveying any media in a pipeline. The functional principle of a diaphragm is in general always based on providing an elastically deformable wall, with the aid of which the flow cross section may be modified in the area of the valve seat. For this purpose, the elastic diaphragm is moved in the direction of the valve seat or away from the valve seat.

DE 20 2014 103 142 U1 discloses a diaphragm valve having a diaphragm including the features of the preamble from Claim 1. Furthermore, the reinforcing fabric layering in the interior of the carrier material of the membrane is introduced. Further membranes featuring a reinforcement layer completely embedded in the elastomer are disclosed in DE 2 063 509, DE 74 20 903, DE 102 26 410 and U.S. Pat. No. 2,615,471. Membranes featuring a reinforcement layer on the side of the elastomer facing towards the media are disclosed in U.S. Pat. No. 3,130,954. DE 20 2009 013 401 discloses a diaphragm being circulated on both sides in an overrun air recirculation valve. U.S. Pat. No. 6,230,609 discloses multilayered elastomer diaphragms.

These requirements for such a diaphragm heavily depend on the installation situation and the field of application of the diaphragm valve. Conventionally, the diaphragm in a diaphragm valve is pressed under preloading force into a resting position. The background is that, in the case of a power and/or pressure failure, it is imperative to know the switching position of the valve. If the valve now is to be switched, an actuator, which overcomes the preloading force and forces the diaphragm into an alternative switching position, is actuated. This conventionally is carried out with the aid of pressurized air, solenoid coils or the like. The switching process is carried out in sudden bursts and, depending on the specific application, is carried out repeatedly or once only.

Against this background, the diaphragm of a diaphragm valve has to fulfill two different criteria: On the one hand, it has to be ensured that the diaphragm in the closed position of the diaphragm valve sufficiently seals. This is carried out in that the elastic base body of the diaphragm is compressed against the valve seat and, in so doing, a sealing surface is generated. Thus, the diaphragm has to be sufficiently elastic. Furthermore, the elasticity of the diaphragm has to be so high that the fast switching processes do not result in component failure.

On the other hand, the diaphragm has to withstand constant compression stresses, in particular for diaphragm valves which are closed in their resting position. It has to be ensured that plastic deformations and/or tears do not result in the diaphragm. Thus, the base body furthermore has to have a certain capability of resistance. Moreover, in the closed state, the total pressure of the medium to be retained is always applied at the diaphragm. The diaphragm has to withstand this counter pressure, without which a formation of tears or a deformation of the diaphragm results. In general, the challenge of optimization is now to improve the elasticity and the capability of resistance of the diaphragm. Conventional diaphragms having elastomers as a base body achieve the required elasticity for generating the sealing effect; however, they often do not achieve the required capability of resistance in regard to the formation of tears.

In order to address this optimization issue, the prior art suggests that the elastomer of the diaphragm features a reinforcement layer, which is configured in the interior of the elastomer. In this instance, the reinforcement layer is to provide the necessary tear strength of the diaphragm, and the elastomer is to provide the elasticity of the diaphragm. Thus, it results that such reinforced diaphragms, which are known from the prior art, substantially have three layers.

Since the mentioned reinforcement layer completely runs in the interior of the elastomer, the outer effective surfaces of the diaphragm and the total thickness of the diaphragm remain unaltered, as a result of which design changes in the valve body are not required.

For the purpose of simplification, it can be assumed that a defined thickness of the elastomer is technically predefined. This thickness is selected so that the diaphragm is sufficiently flexible and adequately resistant when interacting with the reinforcement layer. If now a reinforcement layer is configured within the diaphragm, the thickness of the elastomer remains constant in sum; however, the reinforcement layer insert reduces, typically halves, the thickness of the elastomer, which forms between the outside of the elastomer and the reinforcement layer.

This entails various disadvantageous effects. For example, it may be disadvantageous that the reduced thickness of the elastomer results in a sealing effect of the valve which is more prone to defects.

A further disadvantageous effect is based on the fact that the reinforcement layers are conventionally connected to the elastomer using an adhesive agent. Presently known adhesive agents however mostly include chemical components, which are not to come into contact with critical media, for example, food substances or medicaments. Moreover, a plurality of other chemical and biological processes under no circumstances are to come into contact with chemical components from the adhesive agent. As described above, a reduction of the thickness of the elastomer as a result increases, owing to the reduced wall strength of the elastomer layer adjoining the medium, the risk that the chemical components from the adhesive agent diffuse through the elastomer into the medium or that the chemical components come into direct contact with the medium because of material defects.

In conclusion, it is to be noted that reinforced diaphragms known previously have a greater strength because of the reinforcement layer; however, this entails a limited performance and a significant expenditure in manufacturing. In particular, this is based on the three-layer configuration of the diaphragm.

SUMMARY OF THE INVENTION

Against this background, it is the object of the present invention to disclose a diaphragm for a diaphragm valve and a method for the manufacture of the diaphragm, for which and despite reduced manufacturing costs an improved performance of the component is achieved.

This object is achieved by a diaphragm according to claim 1 and by a method according to Claim 9. Advantageous further refinements of the present invention are described in the respective dependent claims.

Thus, the diaphragm according to the present invention is characterized by the fact that the reinforcement layer is disposed on the outside of the base body on the side of the base body facing away from the media.

The term "the side facing towards the media" refers to a surface or outer contour of the diaphragm which is situated closer to the medium to be conveyed than another side, surface or outer contour of the diaphragm. This however does not mean that the medium to be conveyed mandatorily is in contact at the side of the diaphragm facing towards the media. Rather, it is also conceivable that potential intermediate layers or spaces between the diaphragms and the medium to be conveyed are present. Accordingly, the term specifies a relative position which defines the relation to another side of the diaphragm. Analogously, it applies for "the side facing away from the media" that this side is further away from the medium to be conveyed than another side, surface or outer contour of the diaphragm.

The positioning of the reinforcement layer on the outside of the base body is based on the finding that the layers conventionally disposed on both sides of the elastomer can be reduced to a single layer, which by its total thickness acts between the reinforcement layer and the medium to be conveyed. Hence, in the closed state of the valve, the total thickness of the elastomer is available to smooth possible unevenness. Such unevenness may, for example, result from roughness on surfaces, material defects in the valve seat or from deposited contaminants.

A further finding is that it may be advantageous if the reinforcement layer can be manually inspected. This may, for example, be carried out by removing a valve component, in particular a valve housing component, as a result of which the reinforcement area may, even in the installed state of the valve, still be inspected in regard to its quality on the side of the diaphragm facing away from the media. A visual inspection of the diaphragm is in particular possible already during the manufacture of the diaphragm, as a result of which, for example, defective diaphragms can be easily identified and be withdrawn from circulation.

Furthermore, by omitting the second elastomer layer disposed on the side facing away from the media, the contact surfaces "reinforcement area" and "base body" are divided in half, as a result of which the likelihood that individual layers detach from one another is significantly reduced.

Within this context, the term "reinforcement area" is to be understood as a reinforcement covering or layer. This may refer, for example, to a textile carrier material, a homogeneous material or a mixture of materials. Decisive is that the reinforcement layer in contrast to the base body has a greater tear strength.

In an advantageous further refinement, the reinforcement area is a fabric. The advantage of using a fabric in or as the reinforcement area is the mechanical strength values typical for fabrics. The combination of elastomer and fabric for reinforcement enables an optimal valve seat sealing by any elastic base body on the side facing towards the media and an advantageous force deflection of surface forces across the fabric on the side facing away from the media.

In the present application, the fabric forms a type of lubricating layer. In so doing, during longer idle times of the diaphragm, a strong adhesion between the force transmission component and the elastomer does not result, because the force flow across the fabric is better introduced into the elastomer of the diaphragm. For this reason, it can be expected that the total service life of the diaphragm is extended.

Furthermore, it has proven to be advantageous if the reinforcement area made from a fabric has a warp thread and weft thread system. A warp thread and weft thread system has the advantage of providing increased strength and tear resistance to the fabric without substantially compromising its flexibility and other welcome properties. This is achieved by an advantageous force transmission along the individual fibers of the fabric having a warp thread and weft thread system.

Generally decisive for the mentioned material properties of the reinforcement area is the material composition of the individual fibers of the reinforcement area or the fabric.

Moreover, it is advantageous in the respective area of application if the reinforcement area has synthetic fibers. Within this context, the term "synthetic fibers" refers to plastic fibers, for example polyester fibers, polyaramide fibers, polyamide fibers, polyurethane fibers, polypropylene fibers, polyolefin fibers or to mixtures thereof. In general, thermoplastics as well as elastomers or duroplastics may be used. One advantage when using synthetic fibers is their great flexibility with regard to the area of application. In this way, for example demands regarding temperature, pressure and flexibility may, depending on the specific requirements, be met by a suitable synthetic fiber composition.

Furthermore, synthetic fibers have the advantage that they only produce minimal frictional forces if these synthetic fibers rub against one another in a fabric composite. As a result, switching processes of the valve may be implemented without high starting moment and power losses. At the same time, synthetic fibers may absorb large tensile forces, as a result of which the capability of resistance of the diaphragm is increased.

If the material properties of the reinforcement area have to meet even higher requirements, the reinforcement area may include glass fiber or carbon fiber reinforced plastic materials. This means that in a plastic material which, for example, is present in the form of a matrix or fiber, additional glass fibers and/or carbon fibers are introduced. These glass and/or carbon fibers provide the reinforcement layer with additional mechanical strength and temperature stability.

In a further refinement, it is advantageous if the reinforcement area has a reinforcement film. The use of reinforcement films has the advantage that these reinforcement films are provided with a wide spectrum of material properties and are more cost efficiently obtained. Advantageously, such reinforcement films are made from plastic or rubber material, as a result of which the processing and the connection of the individual reinforcement layers to the elastomer layer is more easily implemented. Within this context, the term "reinforcement film" is generally to be understood as an elastically deformable layer. This layer may be made of organic and inorganic materials. For example, it is also conceivable that a thin metallic layer is used. In this instance, the reinforcement film does not mandatorily have a closed planar surface and be made of a single continuous structure. It is also possible that the reinforcement film is made of a plurality of organic and/or inorganic substructures, which form one reinforcement film when interacting with one another.

It is advantageous if the base area at least in sections is thicker than the reinforcement area. As described previously, the object is achieved if the thickness of the elastomer is as great as possible so as to generate, in the closed state of the valve, a sealing surface as great as possible on the valve seat and, thus, to provide a material barrier as great as possible between the medium to be conveyed and the adhesive agent. Consequently, it is advantageous to design the reinforcement layer as flat as possible so that the total thickness of the diaphragm according to the present invention remains identical to the total thickness of a non-reinforced diaphragm. The thickness of the base body in the area of the valve seat is particularly to be highlighted, because the already mentioned sealing of the valve seat occurs in this location.

In a further refinement, it is advantageous if, on those surfaces of the force transmission component and/or of the reinforcement area which form an effective surface pair with the base body, an adhesive agent is provided between the effective surfaces. In addition to the reinforcement layer, other components, in particular the force transmission component, are in contact with the diaphragm. In order to enable an effective adhesion of all components to the base body, preferably all effective surfaces connected to the base body have an adhesive agent. As a result, the risk of the components which are in contact with the base body detaching may be reduced. Within this context, the term "adhesive agent" refers to a material which is suitable to non-positively or intermaterially connect the base body to the adjacent component.

In order to extend the service life of the diaphragm, it is advantageous if the base body and/or the reinforcement area features a vulcanizable elastomer. The increasing degree of cross-linking when vulcanizing results in improving the material properties of rubber-based components in that these components become more dimensionally stable, more tear-resistant and more resistant against aging and weather conditions. The vulcanizability of the base body has the advantage that the rubber can be connected to metal components. This is carried out with the aid of the previously mentioned adhesive agent, which in this case is a rubber-metal bonding agent.

In a further refinement, it may be advantageous if the base body is vulcanized onto the force transmission component and/or the reinforcement area. With the aid of this method, metal and rubber parts of most different forms and geometries may be connected to one another to form a unit which has great adhesive strength and is corrosion resistant. This method may be used, for example, if the force transmission component is to be partially wrapped by a vulcanizable elastomer along its length protruding from the diaphragm. On account of such a sheathing, the effective surface available for the force transmission from the force transmission component into the elastomer may be enlarged and the risk of tear formation at the transition from metal to elastomer may be reduced.

In a further refinement, it may be advantageous if the base body is generated with the aid of calendering before the vulcanization. The calendering enables to provide a starting layer having a constant layer thickness, from which a blank for the base body of the diaphragm may be generated. Furthermore, with the aid of calendering, the surface quality of the base body may be manipulated in a targeted manner. For example, with the aid of calendering, a defined roughness or texture may be implemented on the surface. In so doing, an optimal surface for the subsequent vulcanization steps may be provided. On the side of the base body facing towards the media, the surface may be calendered according to requirements. For example, this may be a surface as smooth as possible if the medium directly adjoins the base body. If an additional layer, which is to be mounted retroactively, is provided on the side facing towards the media, it may be furthermore advantageous to calender the respective surface by a slightly increased roughness.

Furthermore, it has been proven advantageous if the force transmission component, the reinforcement area, the base body and additional elastomer are positioned by a forming tool before the vulcanization. The advantage is that, by positioning in a forming tool before the vulcanization, all components of the diaphragm can be precisely positioned and subsequently can be vulcanized collectively in a single process step. A further advantage is that, in this way, also more complex configurations of the diaphragm may be simply and repeatedly manufactured.

BRIEF DESCRIPTION OF THE DRAWINGS

Subsequently, the present invention is described in greater detail on the basis of an exemplary embodiment illustrated in the drawings.

DETAILED DESCRIPTION

Figure 1:
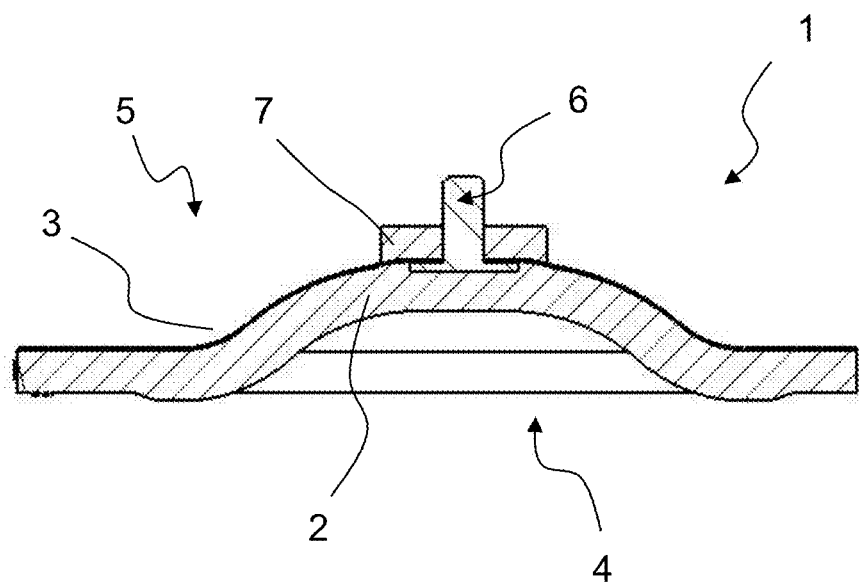
FIG. 1 shows schematically a cross-sectional view of a diaphragm according to the present invention.

FIG. 1 shows a diaphragm 1 having a base body 2 formed in a bell-shaped manner and a reinforcement area 3 mounted on base body 2. The bottom side of diaphragm 1 is side 4 facing towards the media; the upper side of diaphragm 1 is side 5 facing away from the media. On side 5 of diaphragm 1 facing away from the media, a force transmission component 6 is inserted into base body 2 in such a manner that reinforcement area 3 is also in contact with force transmission component 6. Force transmission component 6 serves to move diaphragm 1 towards and away from a valve seat 10 illustrated in FIG. 3, which is located below force transmission component 6. In order to configure the force transmission into diaphragm 1 as smooth as possible, the force transmission component in sections is surrounded by an elastomer extension 7. In this area, the diaphragm 1 has three layers because reinforcement area 3 extends on base body 1 of diaphragm 1 across the total surface on side 5 facing away from the media. As shown in FIG. 1, the diaphragm is however designed substantially in two layers, which is made up of the elastomer layer and the reinforcement layer.

Figure 2:
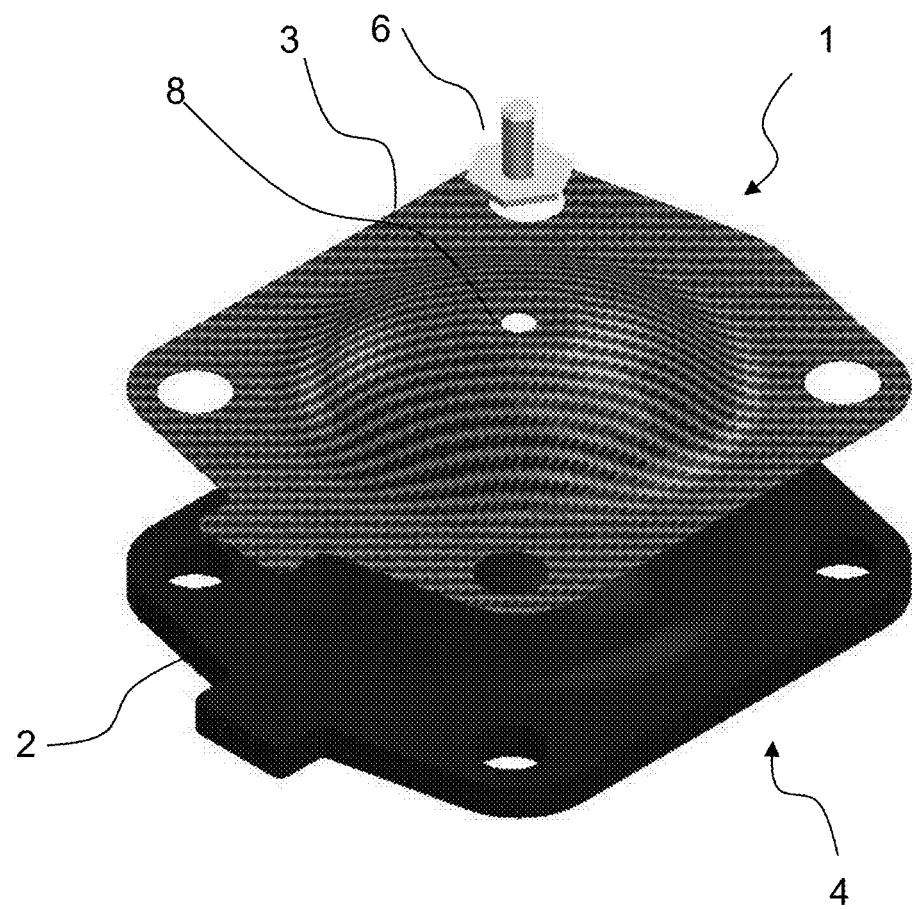
FIG. 2 shows an exploded view of a diaphragm according to the present invention and according to the exemplary embodiment of FIG. 1 in a perspective view.

FIG. 2 illustrates the individual components of diaphragm 1 on the basis of a perspective exploded illustration. In this instance, two-layered diaphragm 1 can be clearly seen on the basis of that base body 2 in an illustrative manner is spatially spaced apart from reinforcement layer 3. Here, force transmission component 6 is shown in an unmounted position. It can however be seen that the shaft of force transmission component 6 is to be inserted through component opening 8 of reinforcement layer 3 in such a manner that a diaphragm 1 as shown in FIG. 1 results.

Figure 3:
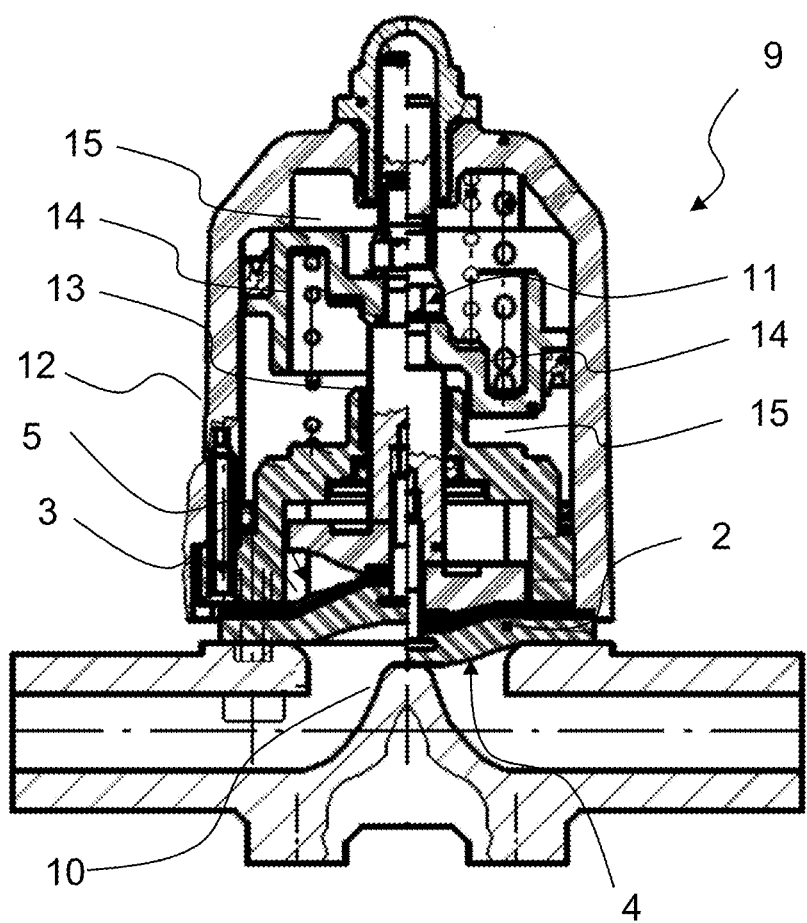
FIG. 3 shows a cross-sectional view of a diaphragm valve having a diaphragm according to the present invention, which is split along the center axis, in two embodiments, namely, on the left half of FIG. 3, a diaphragm valve closed by default and, on the right half of FIG. 3, a diaphragm valve open by default.

FIG. 3 shows a diaphragm valve 9 having a diaphragm 1 installed in diaphragm valve 9 on the basis of a schematic cross-sectional illustration of the complete diaphragm valve 9. On the basis of two diaphragm positions, it is here illustrated, in which way diaphragm 1 fits on valve seat 10 to generate the desired sealing effect on side 4 of diaphragm 1 facing towards the media.

In the shown illustration, the left side of FIG. 3 illustrates the open position of diaphragm valve 9 and the right side of FIG. 3 illustrates the closed position of diaphragm valve 9. The illustration shows two different embodiments of diaphragm valve 9, namely one being open by default (left) and one being closed by default (right). Diaphragm 1 is switched with the aid of a spindle drive 11, which is located in the interior of valve housing 12. The force flow for switching diaphragm 1 is carried out via a valve spindle 13, which is connected to spindle drive 11 and force transmission component 6. Spindle drive 11 is substantially made up of a pressure spring 14 positioning valve spindle 13 and of a switching chamber 15 applyable by pressurized air. If switching chamber 15 is applied by pressurized air, valve spindle 13 moves against the spring force of pressure spring 14. In the case of the embodiment "open by default" (left), valve spindle 13 now moves downwards; in the case of the embodiment "closed by default" (right), valve spindle 13 moves upwards when switching diaphragm valve 9. For each movement of valve spindle 13, diaphragm 1 is moved as well. Since these movements occur explosively (pressurized air inflows in sudden bursts into the chamber, the spring retracting when pressure is released from the chamber), the diaphragm has to be configured in an adequately resistant manner and a force flow as smoothly as possible from valve spindle 13 onto diaphragm 1 has to be enabled. This is substantially the object of force transmission component 6 which, as shown in FIGS. 1 and 2, positively engages into reinforcement layer 3 and base body 2 of diaphragm 1.

LIST OF REFERENCE CHARACTERS 1. diaphragm
2. base body
3. reinforcement area
4. side facing towards the media
5. side facing away from the media
6. force transmission component
7. elastomer extension
8. component opening
9. diaphragm valve
10. valve seat
11. spindle drive
12. valve housing
13. valve spindle
14. pressure spring
15. switching chamber

What is claimed is:

1. A diaphragm for a diaphragm valve having a base body made from an elastomer, wherein the base body comprises a side facing towards a media and a side facing away from the media, wherein a force transmission component is disposed at the base body on the side facing away from the media for the attachment of a valve spindle for a diaphragm valve, and wherein an enlarged head of the force transmission component is sandwiched between the base body and a reinforcement layer affixed to the base body,
   wherein the reinforcement layer is disposed on the outside of the base body on the side of the base body facing away from the media, and
   wherein the base body at least in sections is thicker than the reinforcement layer.

2. The diaphragm as recited in claim 1, wherein, the reinforcement layer is a fabric.

3. The diaphragm as recited in claim 2, wherein, the reinforcement layer comprises a warp thread and weft thread system.

4. The diaphragm as recited in claim 1, wherein, the reinforcement layer comprises synthetic fibers.

5. The diaphragm as recited in claim 1, wherein, the reinforcement layer comprises glass or carbon fiber reinforced plastic material.

6. The diaphragm as recited in claim 1, wherein, the reinforcement layer is a reinforcement film.

7. The diaphragm as recited in claim 1, wherein, an adhesive agent is provided on those surfaces of the force transmission component and/or of the reinforcement layer, which form a surface pair with the base body.

8. The diaphragm as recited in claim 1, wherein, the base body and/or the reinforcement layer comprises a vulcanizable elastomer.

9. A valve having a diaphragm as recited in claim 1.

10. The diaphragm as recited in claim 1, wherein, the base body is vulcanized onto the force transmission component and/or the reinforcement layer.

11. The method diaphragm as recited in claim 9, wherein, the base body has been generated with the aid of calendering before the vulcanization.

12. The method diaphragm as recited in claim 9, wherein, the force transmission component, the reinforcement layer, and the base body are positioned in a forming tool before the vulcanization.

* * * * *